Patented May 4, 1926.

1,583,658

UNITED STATES PATENT OFFICE.

HANS T. CLARKE, OF ROCHESTER, NEW YORK, ASSIGNOR TO EASTMAN KODAK COMPANY, OF ROCHESTER, NEW YORK, A CORPORATION OF NEW YORK.

PROCESS OF PREPARING PENTAERYTHRITOL TETRACETATE.

No Drawing.     Application filed August 1, 1924. Serial No. 729,498.

*To all whom it may concern:*

Be it known that I, HANS T. CLARKE, a subject of the King of Great Britain, residing at Rochester, in the county of Monroe and State of New York, have invented certain new and useful Improvements in Process of Preparing Pentaerythritol Tetracetate, of which the following is a full, clear, and exact specification.

This invention relates to processes of preparing pentaerythritol tetracetate. One object of the invention is to provide a relatively simple and reliable process for obtaining this substance. Another object of the invention is to provide a process in which acetic acid can be used directly instead of the relatively more expensive acetic anhydride. Other objects will hereinafter appear.

As far as I am aware, pentaerythritol tetracetate has been heretofore prepared by the action of acetic anhydride on pentaerythritol. Since acetic anhydride is a relatively expensive ingredient, it is highly desirable to replace it with less expensive acetic acid. I have found that this can be done if pentaerythritol be heated with acetic acid under such conditions that water formed during the esterification is removed during such reaction. Preferably, I employ an excess of glacial acetic acid, and the water is fractionally distilled away, practically as fast at it is formed. While not essential, I also prefer to facilitate the reaction by the presence of a catalytic agent, such as sulfuric acid. Moreover, I prefer to separate the products of the reaction from any excess reagents or by-products by fractional distillation, contamination by sulfuric acid being desirably avoided by neutralizing the sulfuric acid, say with a metallic acetate, before the final distillations take place.

By way of illustration, a mixture of 250 parts of pentaerythritol, 1000 parts of glacial acetic acid and 1 part of strong or substantially anhydrous sulfuric acid is heated to approximately its boiling point, under substantially reflux conditions, the vapor which is allowed to escape being kept at a temperature below 105° C. as long as possible,—that is, throughout practically the whole esterification reaction. This is not a critical temperature, but any temperature which facilitates the removal of water vapor and at the same time is below a temperature at which acetic acid vapors are rapidly evolved is usable. By cooling the exit from the distilling apparatus to such a temperature and allowing the condensed vapors of higher boiling point to flow back into the reaction mixture, I obtain a very simple and reliable control of the reaction, the water vapor being removed sufficiently promptly so that it does not retard the esterification.

When the evolution of water vapor has sufficiently lessened or practically ceased, the temperature of the escaping vapor is allowed to rise to the boiling point of pure acetic acid. For instance, if the escaping vapor has been kept at or slightly below 105° C., the temperature is so adjusted that vapors at approximately 118° C. can pass out,—say into a final condenser. The lessening or ending of the evolution of water vapor indicates a substantial completion of the esterification reaction, and any excess of acetic acid is then removed, while the temperature of the escaping vapors is kept around it boiling point.

The pentaerythritol tetracetate boils at a practically constant temperature under reduced pressure,—for example, at about 184 to 186° C. under 9 mm. pressure or 190 to 192° C. under 20 mm. It is, therefore, readily separated from any remaining ingredients of the reaction mixture by fractional distillation under such conditions. This fractional distillation leaves it in a substantially pure state, in which it is sufficiently free from impurities to be used in cellulosic solutions and dopes. But if it be desired to keep it especially pure for special purposes, it may, of course, be dissolved in a solvent, such as hot benzene, from which it is crystallized out upon cooling in the form of colorless needles.

In order to avoid contamination by sulfuric acid the latter is preferably "killed", after the esterification and before the fractional distillation of the product, by adding to the reaction mixture an amount of metallic acetate (such as anhydrous sodium acetate) just sufficient or slightly more than sufficient to react with all of the sulfuric acid. This reaction forms sodium sulfate and liberates acetic acid. The latter distills off during the step described for its removal. The sodium sulfate and any slight excess of sodium acetate remain behind, when the pentaerythritol tetracetate is distilled away and condensed.

It will be understood that the hereinabove recited details of proportions and temperatures are purely illustrative and may be greatly varied without departing from the invention as defined in the claims. For example, an amount of acetic acid can be used which is largely in excess of that required for the esterification reaction. But the process is operative when there is used altogether during the reaction only a stoichiometric or slightly greater amount of the acid. While I prefer to use a catalytic agent, such as sulfuric acid, that may be omitted without rendering the action inoperative. The exit temperatures of the vapor may also be varied within considerable limits, provided that free acetic acid always remains in the reaction mixture and the evolution of the water formed during the esterification is facilitated.

Having thus described my invention, what I claim as new and desire to secure by Letters Patent is:

1. In the process of preparing pentaerythritol tetracetate, the steps of heating a mixture of pentaerythritol and acetic acid to bring about the esterification, and, during the reaction, removing the water formed thereby.

2. In the process of preparing pentaerythritol tetracetate, the steps of boiling pentaerythritol with an excess of glacial acetic acid and removing the water formed during the esterification by fractional distillation.

3. In the process of preparing pentaerythritol tetracetate, the steps of heating pentaerythritol with an excess of acetic acid and fractionally distilling off water formed during the esterification while keeping the temperature of the escaping vapors below the boiling point of acetic acid.

4. In the process of preparing pentaerythritol tetracetate, the steps of heating pentaerythritol and acetic acid to promote the esterification and, during the reaction, removing water formed therein by fractional distillation, the escaping vapors being kept below 105° C.

5. In the process of preparing pentaerythritol tetracetate, the steps of heating pentaerythritol and acetic acid to promote the esterification, and, during the reaction, fractionally distilling off water formed therein until the evolution of water vapor substantially ceases.

6. In the process of preparing pentaerythritol tetracetate, the steps of heating a mixture of pentaerythritol, acetic acid and a catalyst to promote the esterification, and during the reaction, removing from the mixture, water formed therein.

7. In the process of preparing pentaerythritol tetracetate, the steps of heating a mixture of pentaerythritol, an excess of glacial acetate acid, and a relatively small amount of sulfuric acid, and, during the reaction, removing water formed therein from said mixture by fractional distillation.

8. In the process of preparing pentaerythritol tetracetate, the steps of heating a mixture of pentaerythritol tetracetate, an excess of glacial acetic acid, and a relatively small amount of sulfuric acid until esterification takes place, during the reaction removing by fractional distillation water formed therein and thereafter distilling off the excess of acetic acid, the sulfuric acid being converted into a metallic sulfate by the addition of a metallic acetate to said mixture after the esterification is completed and before all of the excess acetic acid has been distilled.

9. In the process of preparing pentaerythritol tetracetate, the steps of heating a mixture of pentaerythritol, an excess of glacial acetic acid, and a relatively small amount of sulfuric acid until esterification takes place, during the reaction removing water formed therein by fractional distillation, the temperature of the escaping vapors being kept below the boiling point of acetic acid until evolution of water vapor substantially ceases, distilling off the excess of acetic acid, reacting on the sulfuric acid with sodium acetate after the evolution of water has ceased and before the distillation of all of the excess acetic acid, and finally distilling off the pentaerythritol tetracetate.

10. In the process of preparing pentaerythritol tetracetate, the steps of heating a mixture of pentaerythritol, and an excess of glacial acetic acid until esterification takes place, during the reaction removing water formed therein by fractional distillation, the temperature of the escaping vapors being kept below the boiling point of acetic acid until the evolution of water vapor substantially ceases, then distilling off the excess of acetic acid and finally separating out the pentaerythritol tetracetate.

Signed at Rochester, New York, this 25th day of July 1924.

HANS T. CLARKE.